US012297995B1

(12) United States Patent
Yang

(10) Patent No.: US 12,297,995 B1
(45) Date of Patent: May 13, 2025

(54) COSMETIC MIRROR

(71) Applicant: Shenzhen Haige Cross Border Technology Co., Ltd., Guangdong (CN)

(72) Inventor: Yunhang Yang, Guangdong (CN)

(73) Assignee: Shenzhen Haige Cross Border Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/803,331

(22) Filed: Aug. 13, 2024

(30) Foreign Application Priority Data

Jul. 26, 2024 (CN) ......................... 202421808373.7

(51) Int. Cl.
*F21V 33/00* (2006.01)
*F21W 131/302* (2006.01)

(52) U.S. Cl.
CPC ..... *F21V 33/004* (2013.01); *F21W 2131/302* (2013.01)

(58) Field of Classification Search
CPC ........................ F21V 33/004; F21W 2131/302
See application file for complete search history.

(56) References Cited

U.S. PATENT DOCUMENTS

2020/0278514 A1* 9/2020 Yang ......................... F21V 3/02
2023/0280004 A1* 9/2023 Donohue .................. F21S 4/22 362/249.06

FOREIGN PATENT DOCUMENTS

JP 2008295935 A * 12/2008

* cited by examiner

*Primary Examiner* — Julie A Bannan

(57) ABSTRACT

A cosmetic mirror includes: a bottom shell, a mirror body, a PCBA board, and a display apparatus. The bottom shell defines a mounting cavity having an opening. A plurality of first positioning tabs are arranged in the mounting cavity. The mirror body is mounted at the opening and covers the opening. The mirror body includes a transparent layer and a light reflective layer. A character displaying window is arranged on the light reflective layer. The PCBA board is fixedly mounted in the mounting cavity. Each side of the PCBA board abuts against at least one first positioning tab. The display apparatus is welded to mounted on the PCBA board and electrically connected to the PCBA board. A character lamp is arranged on the display apparatus and is selectively illuminated to display a number or a symbol. The character lamp is disposed corresponding to the character displaying window.

20 Claims, 11 Drawing Sheets

201
202
203
2021
205
204

COSMETIC MIRROR

CROSS REFERENCE TO RELATED APPLICATIONS

The present application claims priorities of the Chinese patent application No. 202421808373.7, filed on Jul. 26, 2024, and contents of which are incorporated herein by its entireties.

TECHNICAL FIELD

The present disclosure relates to the field of cosmetics, and in particular to cosmetic mirror.

BACKGROUND

Mirrors are usually used by users to prepare appearances. A clear and bright mirror may facilitate the user to get dressed up. In the art, types and styles of mirrors are increasing, a cosmetic mirror that can emit light is available in the art, and a digital display screen may even be arranged inside the light emitting cosmetic mirror to display time, temperature and other information.

Light reflection of a mirror body mainly is achieved based on a metal layer (a light reflection layer) plated thereon. The digital display screen is arranged inside the cosmetic mirror, and in order to enable characters on the digital display screen to be displayed through the plated metal layer, a window corresponding to a shape of the characters on the digital display screen needs to be arranged on the plated metal layer. For aesthetic considerations, an edge of the window needs to coincide with an edge of the characters, or the edge of the window is slightly smaller than the edge of the characters. However, for the cosmetic mirror in the art, the display screen inside the cosmetic mirror is positioned and fixed only by a screw. When positioning by the screw, a position of the digital display screen during mounting may be deviated largely. The position of the digital display screen needs to be adjusted for a plurality of times to enable the characters to be located corresponding to the window. Therefore, mounting of the cosmetic mirror is time-consuming and inefficient.

SUMMARY OF THE DISCLOSURE

In a first aspect, the present disclosure provides a cosmetic mirror, including: a bottom shell, a mirror body, a PCBA board, and a display apparatus. The bottom shell defines a mounting cavity. An opening is located at a top of the mounting cavity, a plurality of first positioning tabs are arranged in the mounting cavity. The mirror body is mounted at the opening and covers the opening; the mirror body comprises a transparent layer and a light reflective layer formed on the transparent layer; a character displaying window is arranged on the light reflective layer. The PCBA board is fixedly mounted in the mounting cavity. Each of a front side, a rear side, a left side, and a right side of the PCBA board abuts against at least one of the plurality of first positioning tabs. The display apparatus is mounted on the PCBA board and electrically connected to the PCBA board. A character lamp is arranged on the display apparatus, the character lamp is selectively illuminated to display a number or a symbol, the character lamp is disposed corresponding to a position of the character displaying window.

BRIEF DESCRIPTION OF THE DRAWINGS

In order to more clearly illustrate technical solutions in the embodiments or in the art of the present disclosure, the accompanying drawings for describing the embodiments or the art will be briefly introduced in the following. Obviously, the accompanying drawings in the following show only some of the embodiments of the present disclosure. Any ordinary skilled person in the art may obtain other accompanying drawings based on these drawings, without making any the creative work.

FIG. 11 is a schematic view of structural distribution of a bottom of the PCB a schematic view of.

REFERENCE NUMERALS IN THE DRAWINGS

Figure 1:
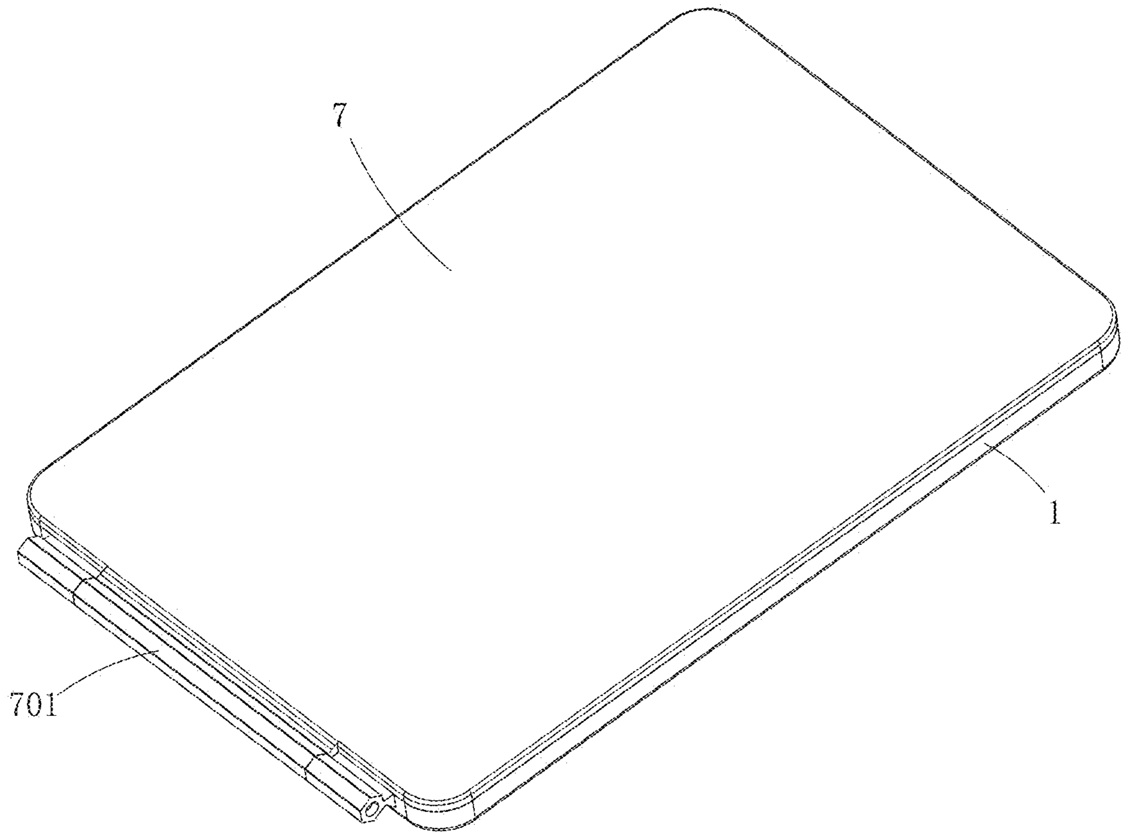
FIG. 1 is a schematic view of an outer appearance of a cosmetic mirror according to an embodiment of the present disclosure.

- 1, bottom shell; 101, mounting cavity; 102, opening; 103, first positioning tab; 104, second positioning tab; 105, third positioning tab; 106, separation ring; 107, through hole; 108, top surface of the bottom shell; 109, concentric support column; 110, bearing tab; 111, heat dissipation hole; 112, charging port; 1011, inner cavity; 1012, outer cavity; 1031, bearing portion; 1032, limiting portion; 1091, cylinder;
- 2, mirror body; 201, transparent layer; 202, light reflective layer; 2021, character displaying window; 203, semi-light-transmitting film; 204, frosted layer; 205, bottom surface of the mirror body;
- 3, PCBA board; 301, front side; 302, rear side; 303, left side; 304, right side; 305, side of the PCBA board; 306, corner of the PCBA board; 307, bottom surface of the PCBA board; 308, charging connector;
- 4, display apparatus; 401, character lamp; 402, time displaying region; 403, temperature displaying region;
- 5, light-emitting apparatus; 501, light-emitting surface;
- 6, battery; 601, side of the battery;
- 7, flip cover; 701, hinge position; 702, bottom surface of the flip cover; 703, first mounting groove; 704, second mounting groove;
- 8, first magnetic member;
- 9, Hall switch;
- 10, second magnetic member;
- 11, third magnetic member;
- 12, indication light;
- 13, first mounting lid;
- 14, second mounting lid.

DETAILED DESCRIPTION

Unless otherwise defined, all technical and scientific terms used herein have the same meaning as commonly understood by any ordinary skilled person in the art. The terms in the specification of the present disclosure are used only for the purpose of describing specific embodiments and are not intended to limit the present disclosure. Terms "include", "have", and any variations thereof in the specification, claims, and, the drawings of the present disclosure are intended to cover non-exclusive embodiments. Terms "first", "second", and so on, in the specification, claims, and the accompanying drawings of present disclosure are used to distinguish different objects and are not intended to describe a particular order.

Reference to "embodiment" herein implies that particular features, structures, or characteristics described an embodiment may be included in at least one embodiment of the present disclosure. Presence of the term at various sections in the specification does not necessarily refer to the same embodiment, nor a separate or alternative embodiment that is mutually exclusive of other embodiments. It is understood by any ordinary skilled person in the art, both explicitly and implicitly, that the embodiments described herein may be combined with other embodiments.

In order to enable any ordinary skilled person in the art to better understand the embodiments of the present disclosure, the technical solutions in the embodiments of the present disclosure will be clearly and completely described below by referring to the accompanying drawings.

As shown in FIGS. 1 to 11, the present disclosure provides a cosmetic mirror including a bottom shell 1, a mirror body 2, a PCBA board 3, a display apparatus 4, and a light-emitting apparatus 5. A positioning tab is arranged in the bottom shell 1, the positioning tab is configured to accurately position the PCBA board 3, such that the display device 4 can be accurately positioned with a corresponding portion of the mirror body 2.

Figure 5:
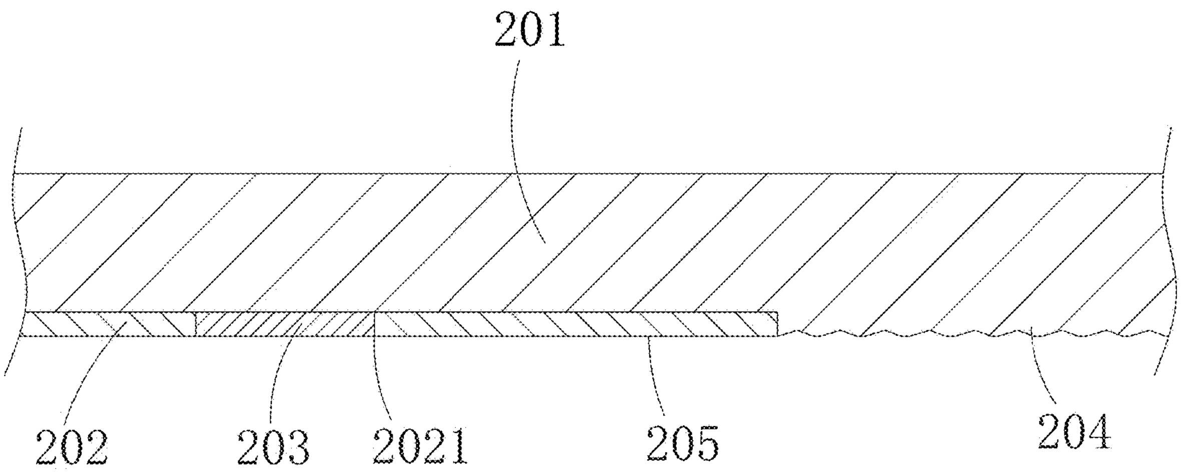
FIG. 5 is a cross-sectional view of the mirror body, showing layered structure of the mirror body, according to an embodiment of the present disclosure.

Specifically, a mounting cavity 101 is defined in the bottom shell 1, an opening 102 is located at a top of the mounting cavity 101. A plurality of first positioning tabs 103 are arranged in the mounting cavity 101. The mirror body 2 is mounted at the opening 102 and covers the opening 102. The mirror body 2 includes a transparent layer 201, a light reflective layer 202, and a semi-light-transmitting film 203. The transparent layer 201 may be made of a transparent material, such as acrylic, glass, and so on. The light reflective layer 202 may be a plated metal layer, which does not allow light to pass through and is a full reflective layer. In some embodiments, the light reflective layer 202 may be a plated aluminum layer. A plurality of character displaying windows 2021 are arranged on the light reflective layer 202. Each character displaying window 2021 is a hollow structure made by laser engraving. The semi-light-transmitting film 203 is coated on the character displaying windows 2021. A size of an edge of the light reflective layer 202 is smaller than a size of an edge of the transparent layer 201. The frosted layer 204 is formed at the edge of the transparent layer 201 and surrounds the light reflective layer 202. The semi-light-transmitting film 203 and the light reflective layer 202 have different light transmittance levels, where the light reflective layer 202 is opaque. To be noted that the light reflective layer is plated on a bottom surface of the transparent layer, and an arrangement relationship of the transparent layer, the light reflective layer, the semi-light-transmitting film, and the frosted layer is shown in FIG. 5.

Figure 6:
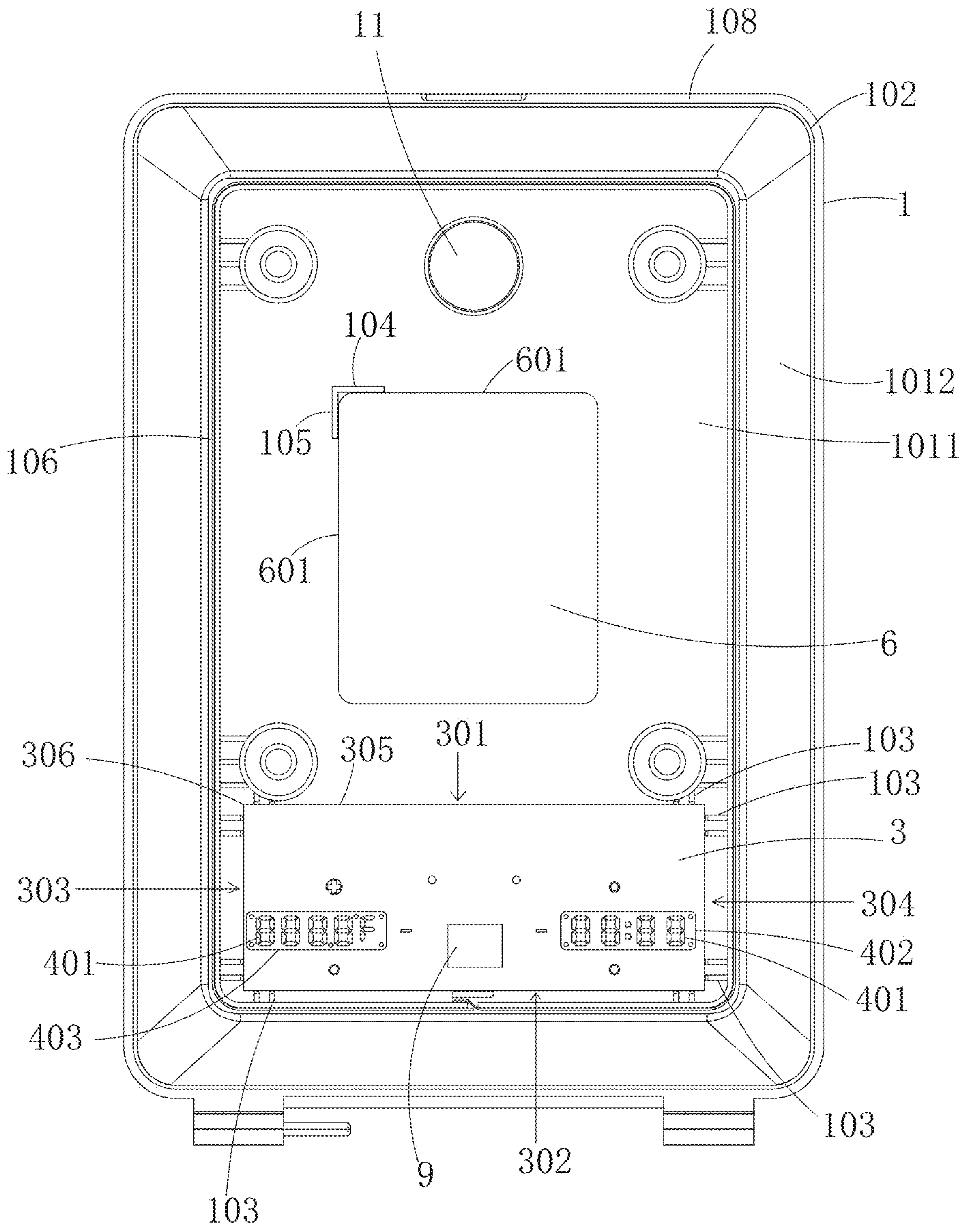
FIG. 6 is a schematic view I of an interior of a bottom shell according to an embodiment of the present disclosure.

As shown in FIG. 6, each of a front side 301, a rear side 302, a left side 303, and a right side 304 of the PCBA board 3 abuts against at least one first positioning tab 103, such that the PCBA board 3 is accurately positioned, and subsequently, the PCBA board 3 is fixedly mounted in the mounting cavity 101 by screws. The display apparatus 4 is welded to the PCBA board 3 and is electrically connected to the PCBA board 3.

Figure 2:
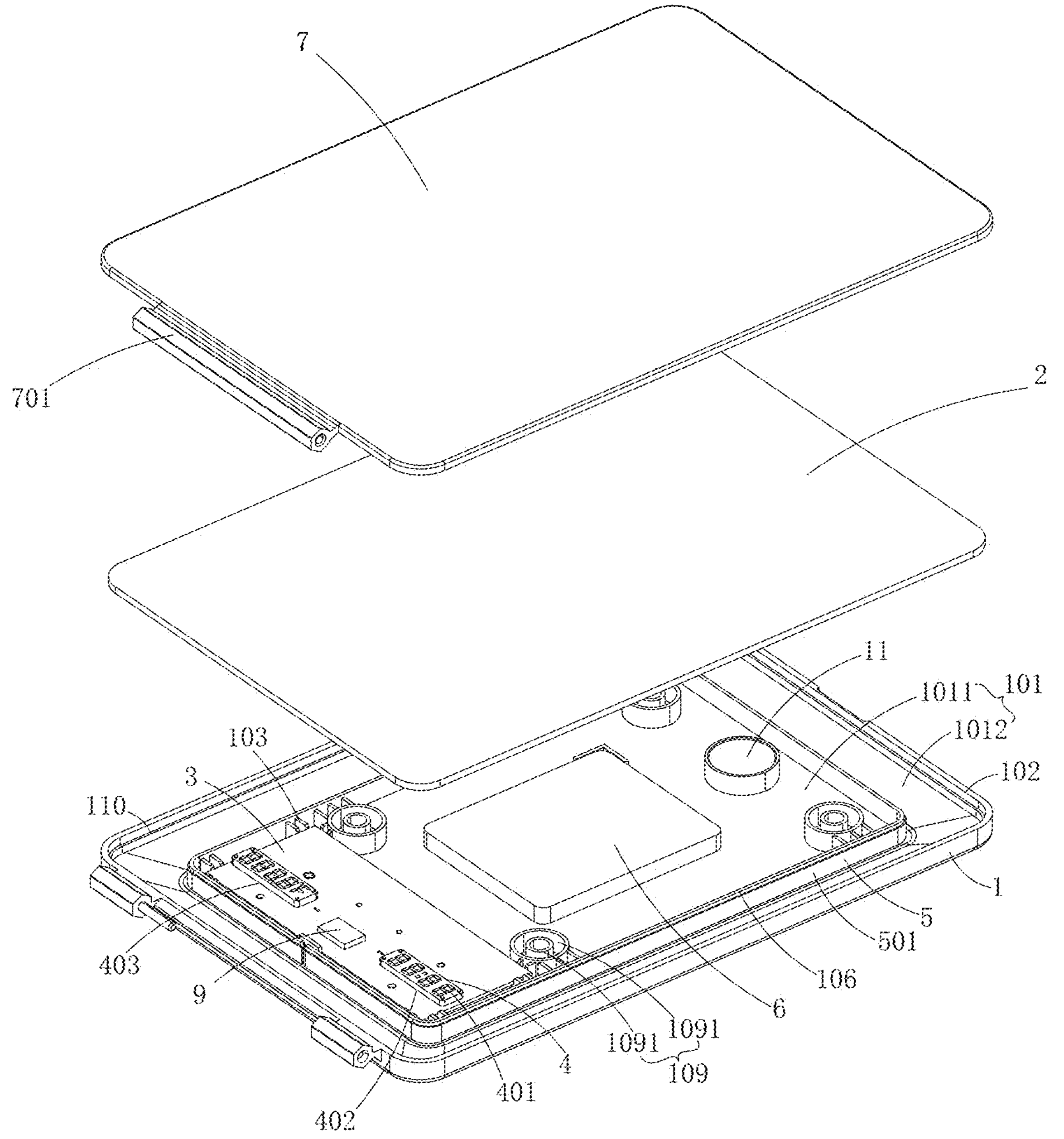
FIG. 2 is an exploded view I of the cosmetic mirror according to an embodiment of the present disclosure.

As shown in FIGS. 2 and 6, the display apparatus 4 is arranged with a character lamp 401. The character lamp 401 may be selectively illuminated to display a number or a symbol. The character lamp 401 is disposed corresponding to the position of the character displaying windows 2021. Specifically, the character lamp 401 has a pattern of the number "8". Each character lamp may selectively emit light to display numbers, from 0 to 9; or may selectively emit light to display some Latin letters. Of course, the display apparatus 4 is further arranged with character lamps 401 for displaying symbols. Specifically, the number of the character lamps 401 is the same as the number of the character displaying windows 2021. The character lamps 401 and the character displaying windows 2021 are in one-to-one correspondence with each other.

The light emitting apparatus 5 is disposed at a position corresponding to the frosted layer 204 and is arranged in the mounting cavity 101. The light emitting apparatus 5 is electrically connected to the PCBA board 3.

In the present embodiment, when the character lamps 401 and the light emitting apparatus 5 do not emit light, brightness inside the mounting cavity 101 is darker than brightness of an exterior of the mirror. An image that can be seen by naked eyes is substantially formed by an ambient light being reflected by the semi-light-transmitting film, such that the mirror body 2 in overall appears as a normal mirror. When the character lamps 401 and/or the light emitting apparatus 5 emit light, the brightness inside the mounting cavity 101 is brighter than that of the exterior of the mirror. An increased amount of the light emitted from the character lamps 401 and/or the light emitting apparatus 5 passes through the semi-light-transmitting film, and a more obvious image is formed and seen by the naked eyes, such that the light from the character lamps 401 and/or the light emitting apparatus 5 is more visible to the naked eyes. The display apparatus 4 is a digital display screen. The display apparatus 4 is substantially configured to display digital information, such as time information, temperature information, and so on. The light emitting apparatus 5 is a flexible light bar and is substantially configured to provide light in a dark environment.

In addition, a size of the opening 102 is slightly larger than a size of the mirror body 2. A bearing tab 110 is arranged in the mounting cavity 101 and surrounds the opening 102. In this way, the mirror body 2 may be displaced slightly along a plane. After a position of the mirror body 2 is adjusted, the mirror body 2 may be fixedly connected to the bearing tab by glue.

Therefore, in the present embodiment, the plurality of positioning tabs are arranged to limit and fix the PCBA board 3 at four directions, such that positioning accuracy of the PCBA board 3 is improved, and that is, positioning accuracy of the display apparatus 4 is improved. In this way, deviation between the character lamps 401 and the character displaying windows 2021 is reduced. The character lamps 401 and the character displaying windows 2021 can be aligned with each other by adjusting the position of the mirror body 2 slightly, during which the mirror body 2 does not need to be opened repeatedly, and screws do not need to be loosened repeatedly to adjust the position of the PCBA board 3.

Furthermore, the PCBA board 3 is planar polygonal. For example, the PCBA board 3 may be triangular, quadrilateral, pentagonal, hexagonal, and so on. The number of first positioning tabs 103 is at least equal to the number of sides 305 of the PCBA board 3. For example, the number of the first positioning tabs 103 is twice or four times of the number of sides 305 of the PCBA board 3. As the number of the first positioning tabs 103 increases, the PCBA board 3 can be positioned more accurately and supported more stably. In the present embodiment, the PCBA board 3 is rectangular, i.e., the PCBA board 3 has four sides 305, which are a front side, a rear side, a left side, and a right side. For example, eight first positioning tabs 103 are arranged. Each side 305 of the PCBA board 3 abuts against two respective ones of the eight first positioning tabs 103. In another example, six first positioning tabs 103 are arranged. Each side 305 of the PCBA board 3 abuts against four respective ones of the six first positioning tabs 103. Further, the first positioning tab 103 is disposed near a corner 306 of the PCBA board 3. Accurate positioning of the PCBA board 3 is achieved by fixation at the corner thereof, such that the PCBA board 3 is prevented from rotating and slipping. Each corner 306 of the PCBA board 3 is correspondingly arranged with at least two of the first positioning tabs 103. Two of the at least two first positioning tabs 103 respectively abut against two sides 305 that form the corner 306.

Figure 7:
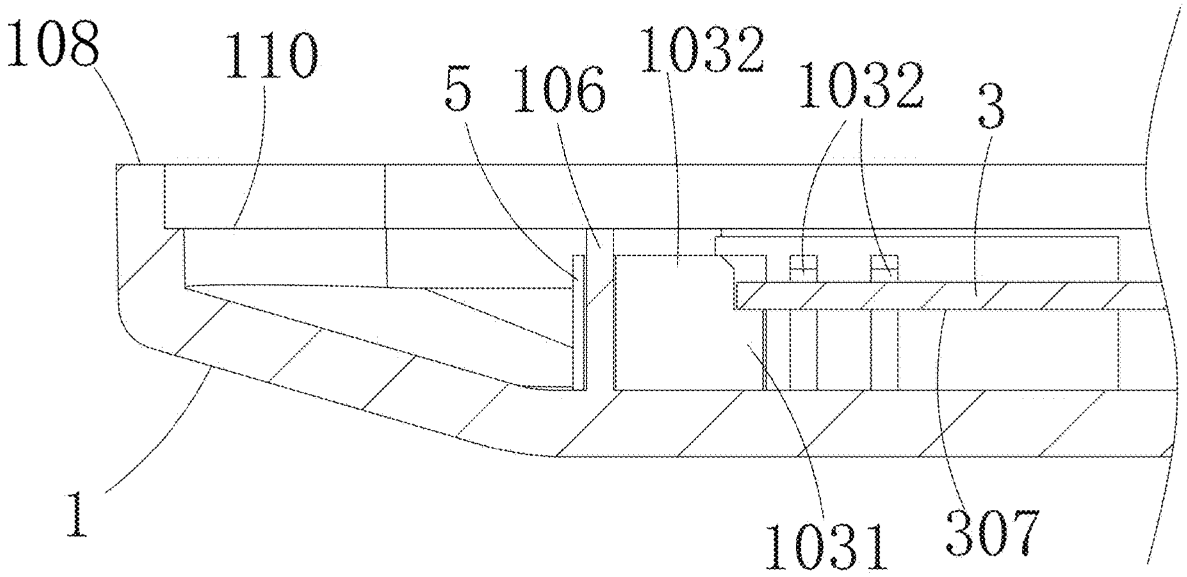
FIG. 7 is a cross-sectional view of partial structure of the cosmetic mirror according to an embodiment of the present disclosure.

In the present embodiment, as shown in FIG. 7, the first positioning tab 103 includes a bearing portion 1031 and a limiting portion 1032. The limiting portion 1032 is disposed perpendicular to the bearing portion 1031. The bearing portion 1031 is configured to abut against a bottom surface 307 of the PCBA board 3 to bear the PCBA board 3 and is configured to elevate the bottom surface 307 of the PCBA board 3 to improve a heat dissipation effect of the PCBA board 3. The limiting portion 1032 is configured to abut against the side 305 of the PCBA board 3 to position the PCBA board 3 and to prevent the PCBA board 3 from displacing along the plane.

Figure 8:
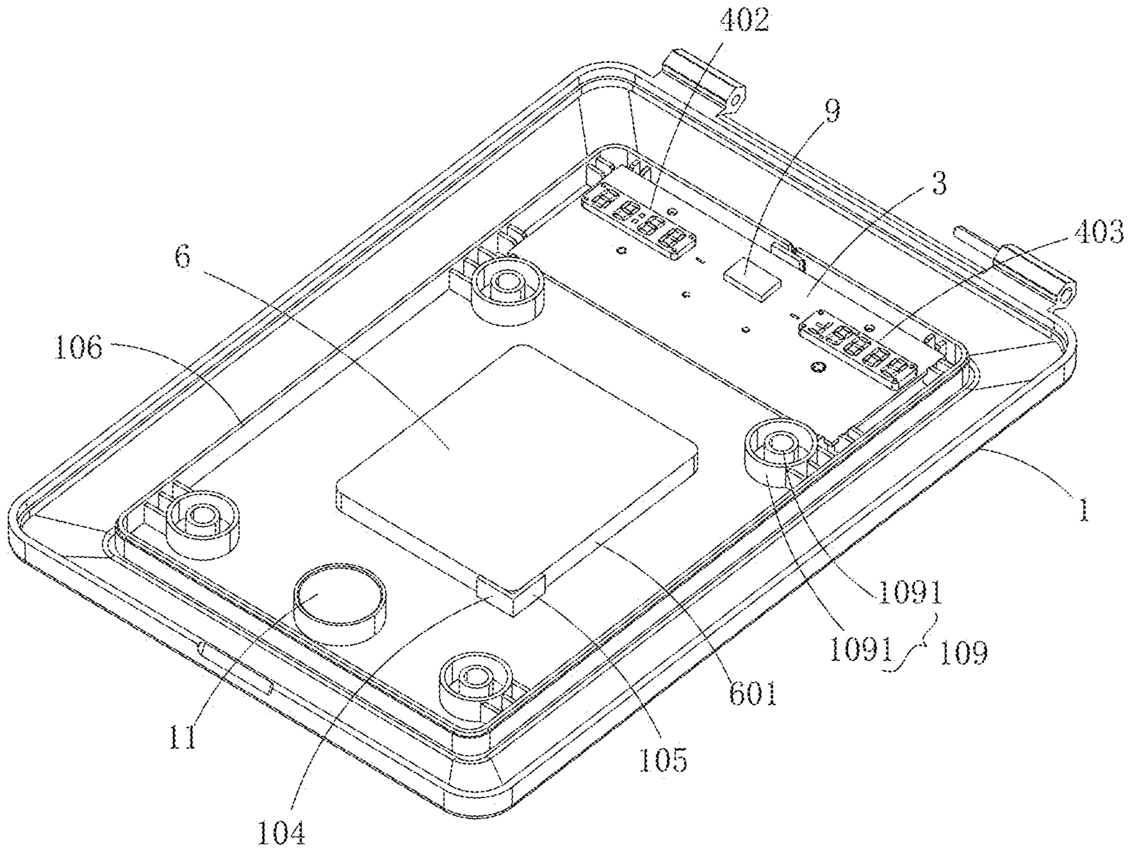
FIG. 8 is a schematic view II of the interior of the bottom shell according to an embodiment of the present disclosure.
Figure 9:
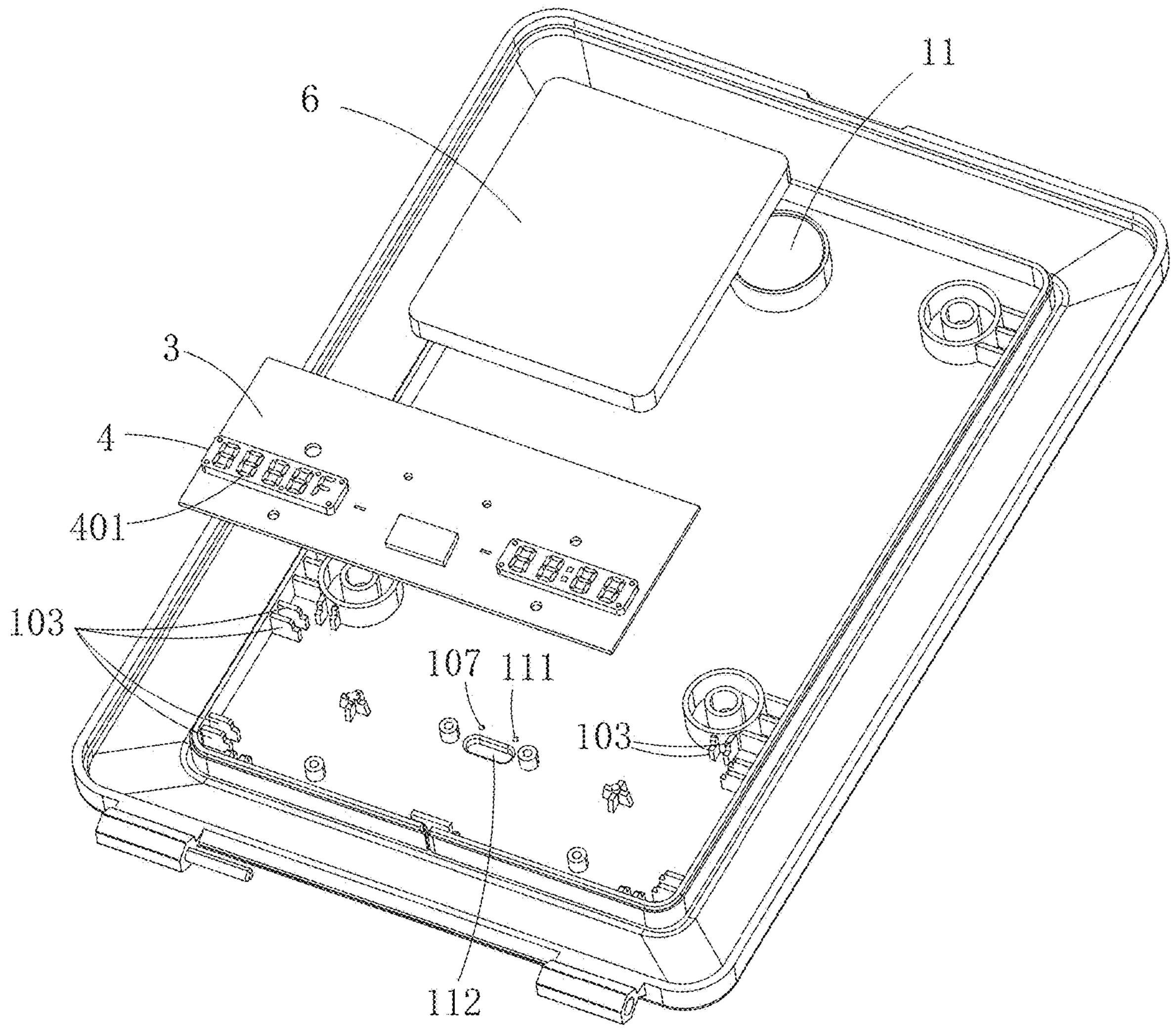
FIG. 9 is a schematic view of the bottom shell, a PCBA board, and a battery according to an embodiment of the present disclosure.
Figure 11:
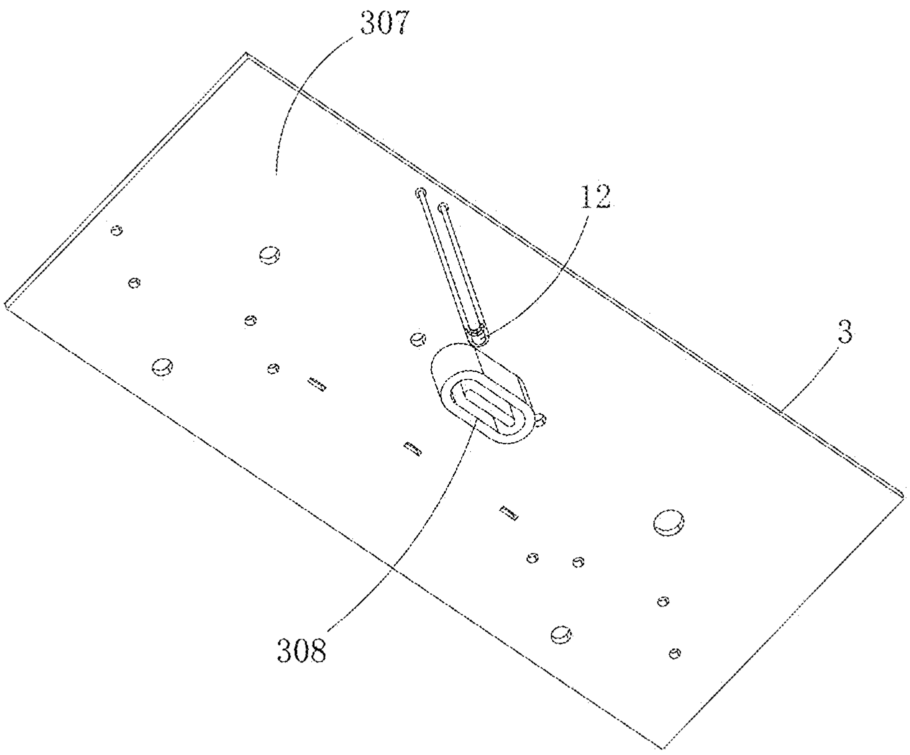

Further, as shown in FIGS. 6 and 8, a second positioning tab 104 and a third positioning tab 105 are arranged in the mounting cavity 101. The second positioning tab 104 and the third positioning tab 105 are connected to each other and are perpendicular to each other. The cosmetic mirror further includes a battery 6. Two adjacent sides 601 of the battery 6 abut against the second locating tab 104 and the third locating tab 105, respectively, such that the battery 6 is positioned. Subsequently, the battery 6 is secured by glue. In the present embodiment, only one corner of the battery 6 needs to be positioned. In this way, manufacturers may arrange batteries 6 in various sizes according to various application scenarios. Of course, a charging port 112 may be defined in the bottom shell 1. A charging connector 308 is integrally formed on the PCBA board 3 as shown in FIGS. 9 and 11.

Further, as shown in FIGS. 2 and 8, a separation ring 106 is arranged in the mounting cavity 101. The separation ring 106 divides the mounting cavity 101 into an inner cavity 1011 and an outer cavity 1012. The inner cavity 1011 is located at an inner side of the separation ring 106, and the outer cavity 1012 is located at an outer side of the separation ring 106. The first positioning tabs 103, the second positioning tab 104, the third positioning tab 105, the PCBA board 3 and the display apparatus 4 are arranged in the inner cavity 1011. The light emitting apparatus 5 is arranged in the outer cavity 1012. The separation ring 106 is configured to prevent the light from the light emitting apparatus 5 from affecting displaying of the character lamps 401.

In the present embodiment, the light emitting apparatus 5 is a flexible light bar. The flexible light bar surrounds the separation ring 106. The flexible light bar is attached to the separation ring 106. A light emitting surface 501 of the flexible light bar faces away from the separation ring 106. The separation ring 106 is disposed perpendicular to the mirror body 2. That is, the light emitted from the flexible light bar is not directly emitted to the mirror body 2. Instead, the light emitted from the flexible light bar is reflected by an inner wall of the mounting cavity 101 and then penetrates through the frosted layer 204. In this way, the light emitted from the flexible light bar is diffused to cover a larger range, and the emitted light is softer to the eyes.

It is understood that, in order to enable the display apparatus 4 to display the time information and the temperature information, the cosmetic mirror further includes a temperature sensor and a timer. The temperature sensor and the timer are electrically connected to the PCBA board 3. The temperature sensor and the timer are adapted to the display apparatus 4. The display apparatus 4 correspondingly includes a time displaying region 402 and a temperature displaying region 403. The character lamps 401 are disposed in both the time displaying region 402 and the temperature displaying region 403. The character displaying windows 2021 are defined in the mirror body 2 corresponding to the time displaying region 402 and the temperature displaying region 403.

Figure 3:
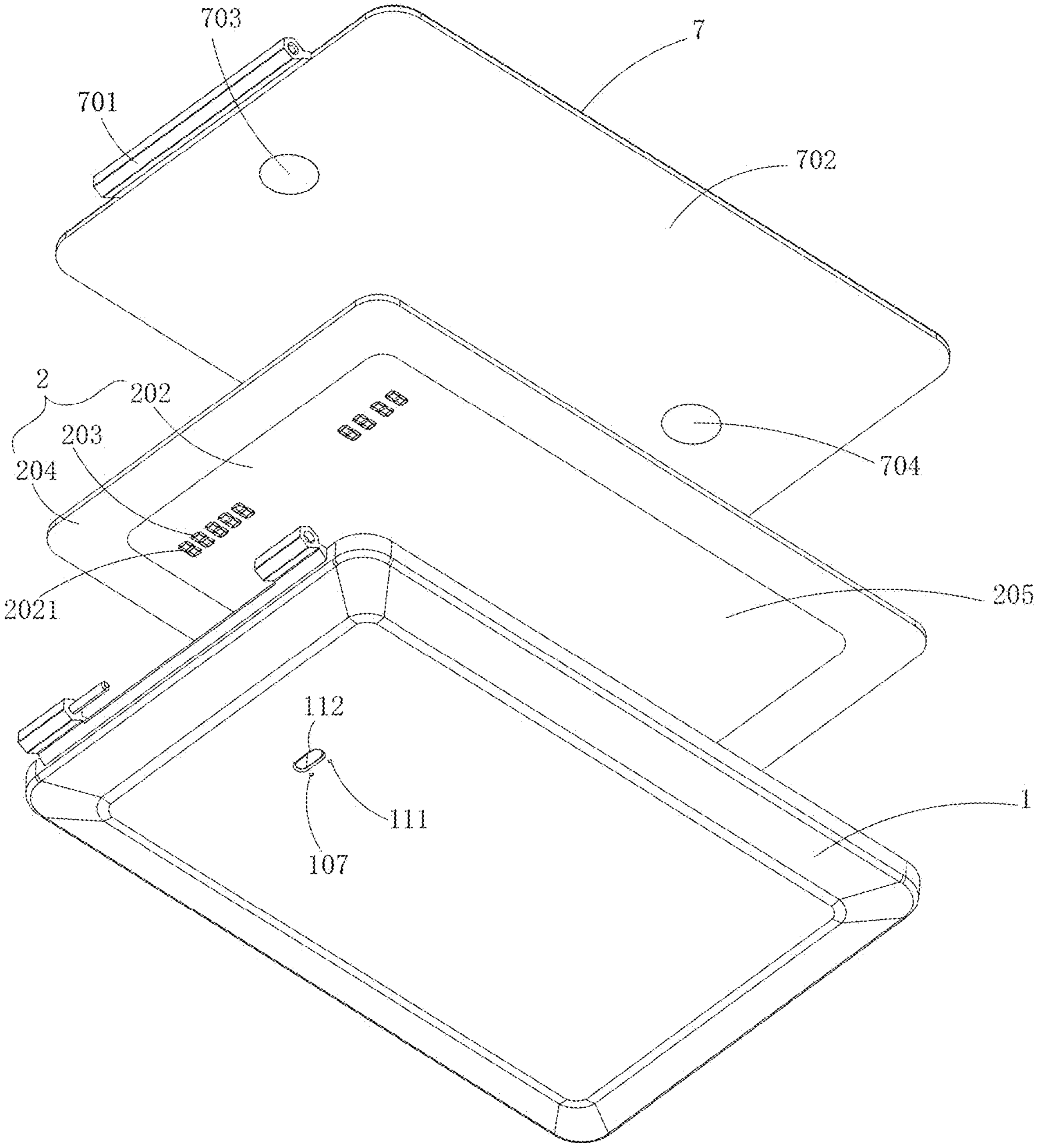
FIG. 3 is an exploded view II of the cosmetic mirror according to an embodiment of the present disclosure.
Figure 4:
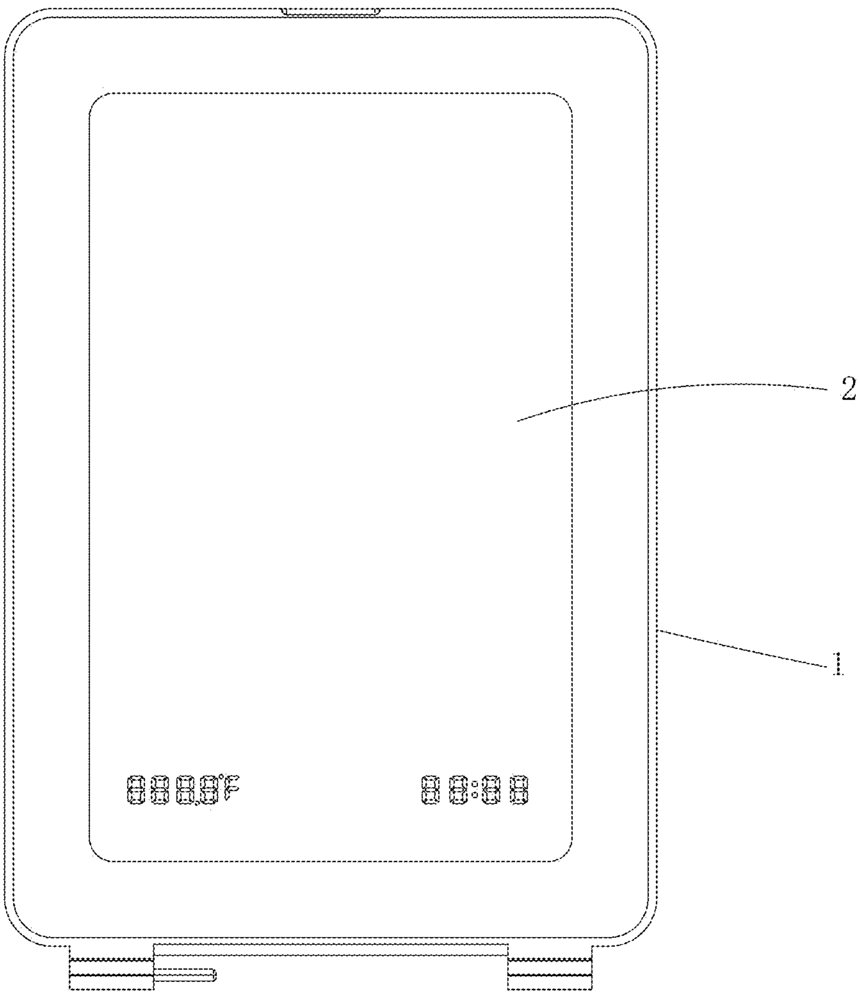
FIG. 4 is a visual effect view of light in the mounting cavity being imaged on a mirror body, when the cosmetic mirror is in use, according to an embodiment of the present disclosure.

Further, as shown in FIGS. 3, 9, and 11, in order to enable the temperature sensor to detect temperatures more accurately, in the present embodiment, the bottom shell 1 defines a through hole 107. The through hole 107 communicates the mounting cavity 101 to the exterior of the mirror. The temperature sensor is disposed at the through hole 107. In addition, the bottom shell 1 further defines a heat dissipation hole 111. The cosmetic mirror further includes an indication light 12, the indication light 12 is disposed at a position corresponding to the heat dissipation hole 111. The indication light 12 is integrally arranged on the PCBA board 3.

Furthermore, the cosmetic mirror further includes a flip cover 7, the flip cover 7 is hinged to the bottom shell 1. The flip cover 7 may swing to a position parallel to the bottom shell 1 and abut against a top surface 108 of the bottom shell 1. When the cosmetic mirror is not in use, the flip cover 7 is used to protect the mirror body 2.

In the present embodiment, the cosmetic mirror further includes a first magnetic member 8 and a Hall switch 9. The first magnetic member 8 is mounted on the flip cover 7, and the Hall switch 9 is arranged in the mounting cavity 101 at a position corresponding to the first magnetic member 8. The Hall switch 9 is integrally formed on the PCBA board 3. When the flip cover 7 is closed on the bottom shell 1, the first magnetic member 8 is disposed near the Hall switch 9, such that the Hall switch 9 is enabled to disconnect electrical connection between the PCBA board 3 and the light emitting apparatus 5, resulting in the flexible light bar being off. When the flip cover 7 is opened with respect to the mirror body, the first magnetic member 8 is disposed away from the Hall switch 9, such that the Hall switch 9 enables the PCBA board 3 to be electrically conductive to the light emitting apparatus 5, i.e., the flexible light bar emits light. The first magnetic member 8 is a permanent magnet.

After the flip cover 7 is closed to the bottom shell 1, in order to prevent the flip cover 7 from being opened with respect to the mirror body by the flip cover itself, in the present embodiment, as shown in FIGS. 3 and 6, the first magnetic member 8 is disposed near the hinge 701 of the flip cover 7. The cosmetic mirror further includes a second magnetic member 10 and a third magnetic member 11. The second magnetic member 10 is mounted on the flip cover 7 and is disposed away from the hinge 701. The third magnetic member 11 is mounted in the mounting cavity 101 at a position corresponding to the second magnetic member 10. When the flip cover 7 is closed over the bottom shell 1, the second magnetic suction member 10 and the third magnetic suction member 11 are magnetically connected to each other to provide a locking force between the flip cover 7 and the bottom shell 1. The second magnetic member 10 and the third magnetic member 11 are both permanent magnets; or one of the second magnetic member 10 and the third magnetic member 11 is a permanent magnet, and the other one of the second magnetic member 10 and the third magnetic member 11 is a ferroalloy.

Figure 10:
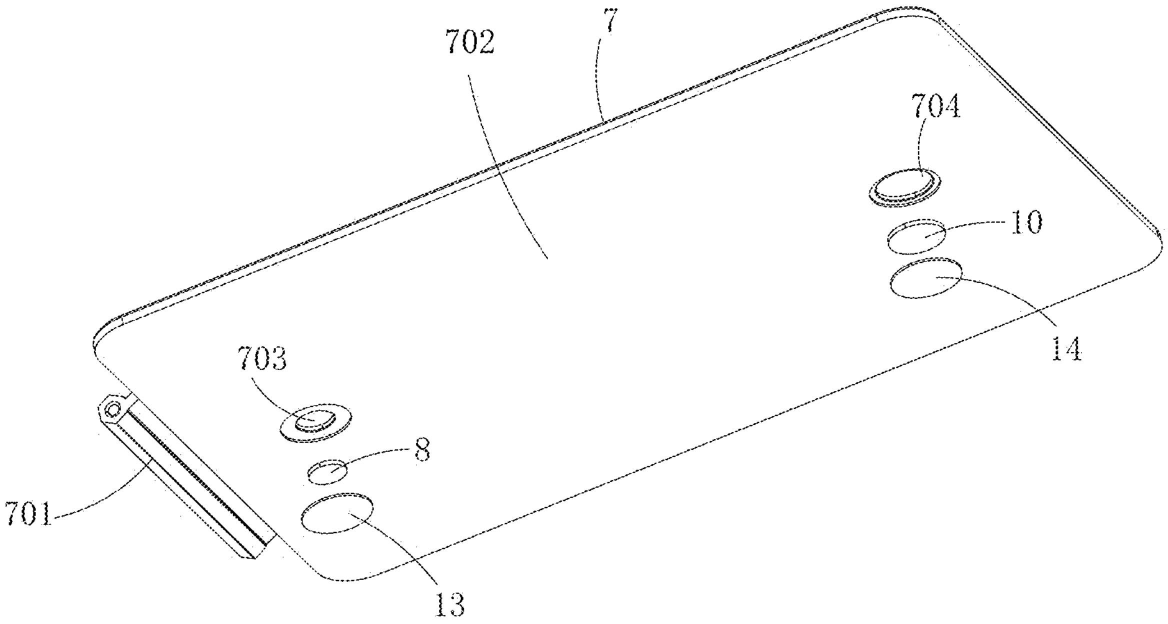
FIG. 10 is a schematic view of a flip cover according to an embodiment of the present disclosure.

As shown in FIG. 10, the bottom surface 702 of the flip cover 7 defines a first mounting groove 703 and a second mounting groove 704. The first magnetic member 8 is received in the first mounting groove 703, and the second magnetic member 10 is received in the second mounting groove 704. The cosmetic mirror further includes a first mounting lid 13 and a second mounting lid 14. The first mounting lid 13 covers the first mounting groove 703 by adhesive bonding, and the second mounting lid 14 covers the second mounting groove 704 by adhesive bonding. In this way, the bottom surface 702 of the flip cover 7, the first mounting lid 13, and the second mounting lid 14 cooperatively form a smooth and flat surface.

Further, as shown in FIGS. 2 and 6, at least three concentric support columns 109 are arranged in the mounting cavity 101. In some embodiments, four concentric support columns 109 are arranged. Each concentric support column 109 includes at least two concentric cylinders 1091. A top of the cylinders 1091 abuts against a bottom surface 205 of the mirror body 2. When the mirror body 2 is pressed, the concentric support columns 109 may increase a contact area with the mirror body 2, such that a pressure force applied on the mirror body 2 is reduced, and the mirror body 2 is prevented from being crushed by an excessively large pressure force.

In addition, for controlling the brightness of the light emitting apparatus 5 and controlling the information display on the display apparatus 4, touch buttons corresponding to the functions are provided on the PCBA board 3. Control of the PCBA board 3 can be achieved in real time by touching corresponding positions on the mirror body 2.

Obviously, the above-described embodiments show only some, not all of, the embodiments of the present disclosure. The accompanying drawings show preferred embodiments of the present disclosure and do not limit the scope of the present disclosure. The present disclosure may be achieved in various forms. These embodiments are provided for the purpose of understanding the present disclosure more thoroughly and comprehensively. Although the present disclosure has been described in detail by referring to the foregoing embodiments, any ordinary skilled person in the art may modify the technical solutions in the specific embodiments or make equivalent substitutions for some technical features therein. Any equivalent structure made based on the contents of the specification and the accompanying drawings of the present disclosure, applied directly or indirectly in other related technical fields, shall all be within the scope of the present disclosure.

What is claimed is:

1. A cosmetic mirror, comprising:

a bottom shell, defining a mounting cavity, wherein, an opening is located at a top of the mounting cavity, a plurality of first positioning tabs are arranged in the mounting cavity;

a mirror body, wherein, the mirror body is mounted at the opening and covers the opening; the mirror body comprises a transparent layer and a light reflective layer formed on the transparent layer; a character displaying window is arranged on the light reflective layer;

a PCBA board, fixedly mounted in the mounting cavity, wherein, each of a front side, a rear side, a left side, and a right side of the PCBA board abuts against at least one of the plurality of first positioning tabs; and a display apparatus, mounted on the PCBA board and electrically connected to the PCBA board; wherein, a character lamp is arranged on the display apparatus, the character lamp is selectively illuminated to display a number or a symbol, the character lamp is disposed corresponding to a position of the character displaying window;

a light emitting apparatus, arranged in the mounting cavity; wherein an orthographic projection of the PCBA board onto the mirror body has no overlapping with an orthographic projection of the light emitting apparatus onto the mirror body.

2. The cosmetic mirror according to claim 1, wherein, the PCBA board is planar polygonal, and the number of the plurality of first positioning tabs is at least equal to the number of sides of the PCBA board.

3. The cosmetic mirror according to claim 2, wherein, the PCBA board is rectangular, the plurality of first positioning tabs comprise eight first positioning tabs, each side of the PCBA board abuts against two respective ones of the eight first positioning tabs.

4. The cosmetic mirror according to claim 3, wherein, each of the plurality of first positioning tabs is disposed near a corner of the PCBA board.

5. The cosmetic mirror according to claim 4, wherein, each corner of the PCBA board is correspondingly arranged with at least two of the first positioning tabs; and two of the at least two first positioning tabs respectively abut against two sides of the PCBA that form the corner.

6. The cosmetic mirror according to claim 1, wherein, each of the plurality of first positioning tabs comprises a bearing portion and a limiting portion; the limiting portion is disposed perpendicular to the bearing portion; the bearing portion is configured to abut against a bottom surface of the PCBA board; the limiting portion is configured to abut against sides of the PCBA board.

7. The cosmetic mirror according to claim 1, wherein, the mirror body further comprises a semi-light-transmitting film; the semi-light-transmitting film is filled at the character displaying window.

8. A cosmetic mirror, comprising:

a bottom shell, defining a mounting cavity, wherein, an opening is located at a top of the mounting cavity, a plurality of first positioning tabs are arranged in the mounting cavity;

a mirror body, wherein, the mirror body is mounted at the opening and covers the opening: the mirror body comprises a transparent layer and a light reflective layer formed on the transparent layer; a character displaying window is arranged on the light reflective layer;

a PCBA board, fixedly mounted in the mounting cavity, wherein, each of a front side, a rear side, a left side, and a right side of the PCBA board abuts against at least one of the plurality of first positioning tabs; and a display apparatus, mounted on the PCBA board and electrically connected to the PCBA board; wherein, a character lamp is arranged on the display apparatus, the character lamp is selectively illuminated to display a number or a symbol, the character lamp is disposed corresponding to a position of the character displaying window;

wherein a size of an edge of the light reflective layer is smaller than a size of an edge of the transparent layer; a frosted layer is formed at the edge of the transparent layer and surrounds the light reflective layer;

the cosmetic mirror further comprises a light emitting apparatus, disposed at a position corresponding to the frosted layer and is arranged in the mounting cavity; the light emitting apparatus is electrically connected to the PCBA board.

9. The cosmetic mirror according to claim 8, wherein, a second positioning tab and a third positioning tab are arranged in the mounting cavity, the second positioning tab and the third positioning tab are connected to each other and are perpendicular to each other;

the cosmetic mirror further includes a battery, two adjacent sides of the battery abut against the second locating tab and the third locating tab, respectively; the battery is fixedly arranged in the mounting cavity and is electrically connected to the PCBA board.

10. The cosmetic mirror according to claim 9, wherein, a separation ring is arranged in the mounting cavity, the separation ring divides the mounting cavity into an inner cavity and an outer cavity, the inner cavity is located at an inner side of the separation ring, and the outer cavity is located at an outer side of the separation ring;

the plurality of first positioning tabs, the second positioning tab, the third positioning tab, the PCBA board and the display apparatus are arranged in the inner cavity, the light emitting apparatus is arranged in the outer cavity.

11. The cosmetic mirror according to claim 10, wherein, the light emitting apparatus is a flexible light bar, the flexible light bar surrounds the separation ring, the flexible light bar is attached to the separation ring, a light emitting surface of the flexible light bar faces away from the separation ring, the separation ring is disposed perpendicular to the mirror body.

12. The cosmetic mirror according to claim 1, further comprising a temperature sensor and a timer, wherein, the temperature sensor and the timer are electrically connected to the PCBA board, the temperature sensor and the timer are adapted to the display apparatus, the display apparatus correspondingly comprises a time displaying region and a temperature displaying region.

13. The cosmetic mirror according to claim 12, wherein, the bottom shell defines a through hole and a heat dissipation hole, the through hole and the heat dissipation hole both communicate the mounting cavity to an exterior of the mirror, the temperature sensor is disposed at the through hole;

the cosmetic mirror further comprises an indication light, the indication light is disposed at a position corresponding to the heat dissipation hole, the indication light is electrically connected to the PCBA board.

14. The cosmetic mirror according to claim 1, further comprising a flip cover, hinged to the bottom shell; wherein, the flip cover is capable of swinging to a position parallel to the bottom shell and abut against a top surface of the bottom shell.

15. The cosmetic mirror according to claim 14, further comprising a first magnetic member and a Hall switch;

wherein, the first magnetic member is mounted on the flip cover, and the Hall switch is arranged in the mounting cavity at a position corresponding to the first magnetic member, the Hall switch is integrally formed on the PCBA board;

when the flip cover is closed on the bottom shell, the first magnetic member is disposed near the Hall switch, the Hall switch is enabled to disconnect electrical connection between the PCBA board and a light emitting apparatus; when the flip cover is opened with respect to the bottom shell, the first magnetic member is disposed away from the Hall switch, the Hall switch enables the PCBA board to be electrically conductive to the light emitting apparatus.

16. The cosmetic mirror according to claim 15, wherein, the first magnetic member is disposed near a hinge of the flip cover;

the cosmetic mirror further comprises a second magnetic member and a third magnetic member, the second magnetic member is mounted on the flip cover and is disposed away from the hinge, the third magnetic member is mounted in the mounting cavity at a position corresponding to the second magnetic member.

17. The cosmetic mirror according to claim 16, wherein, a bottom surface of the flip cover defines a first mounting groove and a second mounting groove, the first magnetic member is received in the first mounting groove, and the second magnetic member is received in the second mounting groove.

18. The cosmetic mirror according to claim 17, wherein, the cosmetic mirror further comprises a first mounting lid and a second mounting lid, the first mounting lid covers the first mounting groove, and the second mounting lid covers the second mounting groove.

19. The cosmetic mirror according to claim 1, wherein, at least three concentric support columns are arranged in the mounting cavity, each of the at least three concentric support column comprises at least two concentric cylinders, a top of the cylinders abuts against a bottom surface of the mirror body.

20. A cosmetic mirror, comprising:

a bottom shell, defining a mounting cavity, wherein, an opening is located at a top of the mounting cavity, a plurality of first positioning tabs are arranged in the mounting cavity;

a mirror body, wherein, the mirror body is mounted at the opening and covers the opening; the mirror body comprises a transparent layer and a light reflective layer formed on the transparent layer; a character displaying window is arranged on the light reflective layer;

a PCBA board, fixedly mounted in the mounting cavity, wherein, each of a front side, a rear side, a left side, and a right side of the PCBA board abuts against at least one of the plurality of first positioning tabs; and a display apparatus, mounted on the PCBA board and electrically connected to the PCBA board; wherein, a character lamp is arranged on the display apparatus, the character lamp is selectively illuminated to display a number or a symbol, the character lamp is disposed corresponding to a position of the character displaying window;

wherein, a size of the opening is slightly larger than a size of the mirror body; a bearing tab is arranged in the mounting cavity and surrounds the opening; the mirror body is fixedly connected to the bearing tab.

* * * * *